No. 693,424. Patented Feb. 18, 1902.
A. McINTOSH.
CHEESE CUTTER.
(Application filed June 15, 1901.)
(No Model.) 2 Sheets—Sheet 1.

Witnesses:
Fred Page
J. F. Groot

Anderson McIntosh, Inventor
By Marion & Marion
Attorneys

THE NORRIS PETERS CO., PHOTO-LITHO., WASHINGTON, D. C.

No. 693,424. Patented Feb. 18, 1902.
A. McINTOSH.
CHEESE CUTTER.
(Application filed June 15, 1901.)
(No Model.) 2 Sheets—Sheet 2.
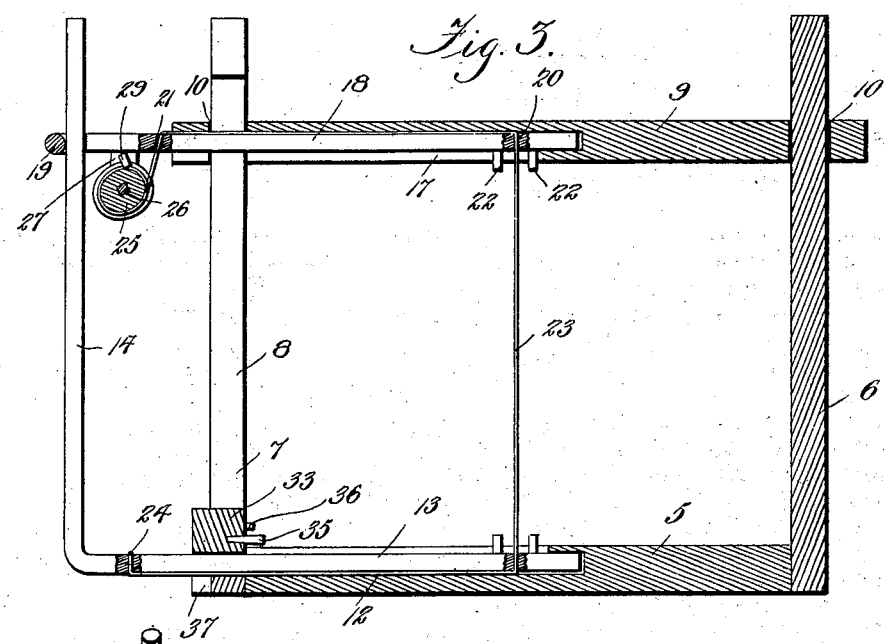
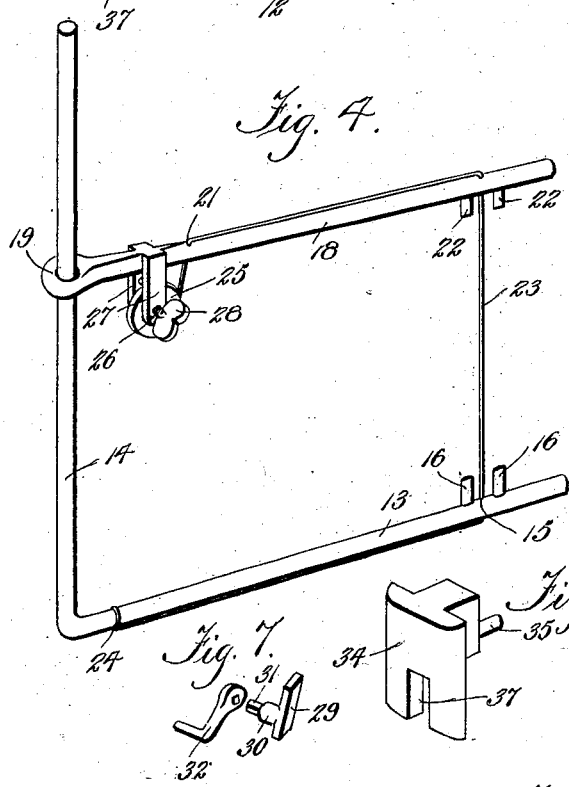
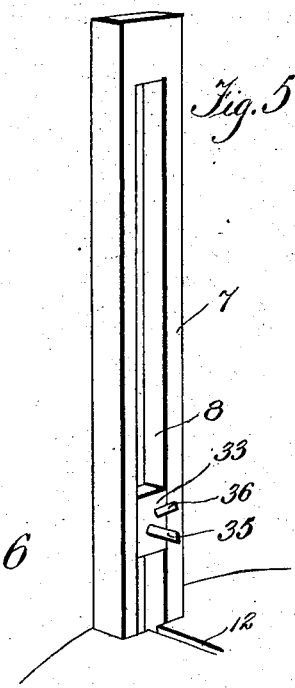
Witnesses:
Anderson McIntosh, Inventor
By Marion Marion
Attorneys

UNITED STATES PATENT OFFICE.

ANDERSON McINTOSH, OF WALLACE, CANADA.

CHEESE-CUTTER.

SPECIFICATION forming part of Letters Patent No. 693,424, dated February 18, 1902.

Application filed June 15, 1901. Serial No. 64,636. (No model.)

*To all whom it may concern:*

Be it known that I, ANDERSON MCINTOSH, a subject of the King of Great Britain, residing at Wallace, county of Cumberland, Province of Nova Scotia, Canada, have invented certain new and useful Improvements in Cheese-Cutters; and I do hereby declare that the following is a full, clear, and exact description of the invention, such as will enable others skilled in the art to which it appertains to make and use the same.

My invention relates to improvements in cheese-cutters; and the object in view is to provide a simple construction for radially cutting slices from a round cheese of any ordinary thickness and to easily sever the hard skin or crust of the cheese on all the sides thereof.

With these ends in view the invention consists in the novel construction and arrangement of parts, which will be hereinafter fully described and claimed.

Figure 1:
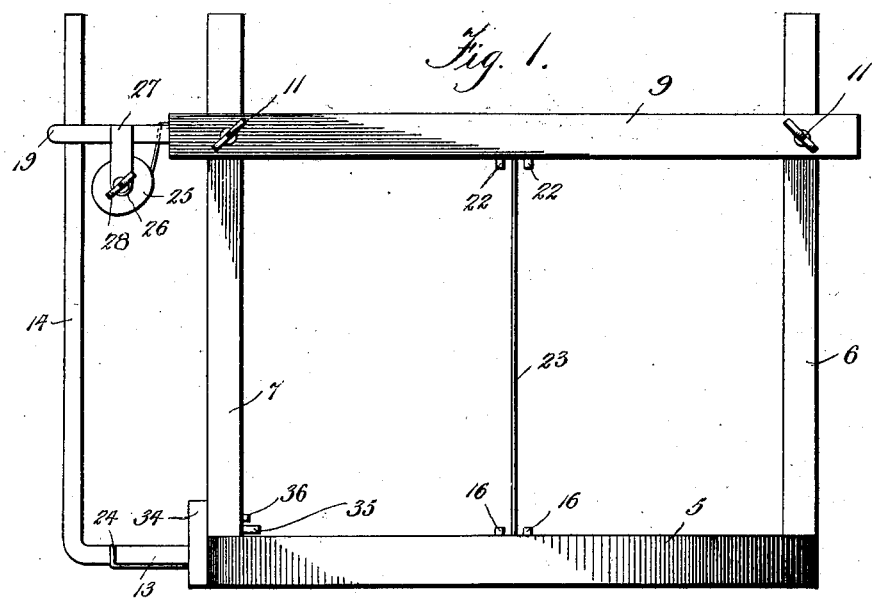
Figure 2:
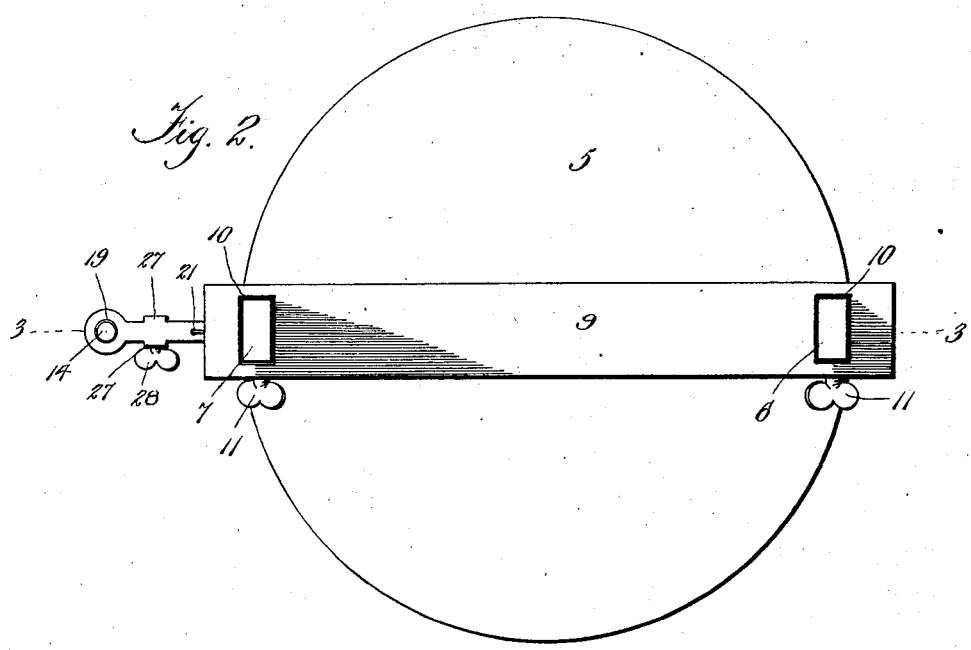

In the drawings hereto annexed, forming a part of this specification, Figure 1 is a side elevation of a cheese-cutter embodying my invention. Fig. 2 is a plan view thereof. Fig. 3 is a vertical cross-section in the plane of the dotted line 3 3 on Fig. 2. Fig. 4 is a detail perspective view of the lower and upper cutter-bars and the cutter-wire. Fig. 5 is a detail perspective view of one of the posts. Fig. 6 is a detail perspective view of the cutter-traveler. Fig. 7 is a detail perspective view of the locking device for the cutter-wire holder.

The same numerals of reference denote like parts in each of the several figures of the drawings.

5 designates the base, which is made in the form of a disk and of a diameter suitable to receive the largest size of cheese. From one side of this base rises the post 6 and from the opposite side extends the post 7, the latter being provided with a longitudinal slot 8. The two posts are parallel and extend upwardly from diametrically opposite sides of the base, and these posts afford the support for a vertically-adjustable supporting-bar 9, the same being provided with suitable slots 10, through which the posts are adapted to pass. Said bar 9 carries the binding-screws 11, which are arranged to impinge against the posts for the purpose of supporting said bar 9 at different elevations and in parallel relation to the base 5, whereby the bar 9 may be raised or lowered, according to the height of the cheese which is to be cut.

The base 5 is provided with a radial groove or channel 12, which extends from the middle of the base toward an edge thereof and so that its outer end will terminate in the plane of the slot 8 of the post 7. (See Figs. 3 and 5.) In this groove or channel is slidably fitted the lower cutter-bar 13, which passes through the lower portion of the slotted post 7, and which cutter-bar is provided at its outer end with an upstanding arm 14. The cutter-bar is provided near its inner portion with the vertical aperture 15, and said bar is also provided with one or more knives 16. Where two of the knives are employed, as shown by Figs. 3 and 4, they are attached to the cutter-bar 13 on opposite sides of the aperture 15 therein.

The supporting-bar 9 is provided in its lower edge or face with a longitudinal groove or channel 17, the same extending from the middle of the bar toward and through one end of the same, as shown by Fig. 3. This groove or channel accommodates the upper cutter-bar 18, which is slidably fitted to the supporting-bar 9 and which has its outer end extended beyond said bar 9 and provided with an eye 19. This eye is loosely fitted on the upstanding arm 14 of the lower cutter-bar, whereby the two bars 13 18 are disposed parallel one with the other, and they are adjustably connected together by the eye 19, fitting slidably on the arm 14. Said upper cutter-bar has an opening 20 near its inner end and a smaller opening 21 near its eye 19. Furthermore, the inner portion of said cutter-bar 18 is formed with the short knives 22, preferably located on opposite sides of the opening 20, although a single knife may be used.

23 designates the cutter-wire, which is attached at one end to the lower cutter-bar 13 near the arm 14 thereof, as indicated at 24 in Figs. 3 and 4. From thence the wire is led along the under side of the cutter-bar 13 until it reaches the aperture 15, through which the wire is passed. From thence the wire passes through the aperture 20 of the upper cutter-bar 18, thence along the upper side of the cutter-bar 18, and is then carried through the aperture 21, so that it may be connected to the elliptical take-up spool 25. The shaft or arbor 26 of the elliptical spool is fitted in the depending bracket 27, which is made fast with the upper cutter-bar 18 near the eye 19 thereof, and said arbor or shaft 26 is provided with a head 28, by which the spool may easily be turned. One end of the cutter-wire 23 is coiled one or more times around this spool 25 and is secured to said spool in any approved way, and when the spool is turned or rotated the wire is adapted to be wound thereon, whereby the operative length of the wire between the cutter-bars 13 18 may be varied according to the height of the cheese and the adjustment of the supporting-bar 9. The rotation of the spool 25 also takes up the slack in the cutter-bar, so as to maintain the latter in a taut condition, and said spool is adapted to be held in its adjusted position by means of a locking device 29. This locking device is arranged within the bracket 27 for one arm thereof to engage with the spool or with the wire which is to be coiled thereon, and said locking device is provided with a pintle 30, the same being fitted loosely in one member of the bracket 27, so as to have a squared end 31 exposed for the attachment of a crank 32, (see Fig. 7,) whereby the locking device may be easily turned into and out of position.

33 designates a traveler which is provided with a flange 34, said traveler arranged to fit snugly in the slot 8 of the post 7, while the flange 34 of the traveler is adapted to ride against the outside of the post. This traveler carries a knife or cutter 35, and it is held from displacement in the slotted post 7 by the guide-pin 36. The lower part of the traveler is formed with a slot 37, which is adapted to receive the lower cutter-bar 13 when the traveler is at the bottom of the post 7, as shown by Fig. 3.

The knives 16 22 on the cutter-bars 13 18 are adapted to sever or cut the hard crust on the top and bottom of the cheese, while the operative length of the cutter-wire 23 between the two bars 13 18 serves to cut through the cheese simultaneously with the operation of the small knives on the crust thereof. The traveler 33 may be raised to a proper height for the blade 35 to engage with the top edge of the cheese, and said traveler may be forcibly depressed with a view to making the knife 35 cut through the hard crust on the sides of the cheese.

The operation is as follows: The knives and cutters are held projected from the frame while the cheese is inserted therein. The traveler 33 is moved from the top to the bottom of the frame, so as to cut the rind at the proper line, and then the cutter-wire is adjusted opposite to the place where the rind has been cut by the knife 34 on the traveler. The upper and lower cutter-bars, having the cutting-wire attached thereto, are now forced inwardly, so that the operative length 23 of the cutter-wire will cut through the cheese, beginning from the outside thereof toward the center. During this radial movement of the cutter-bars and the cutter-wire said cutter-bars are guided by the base 5 and the supporting-bar 9, and the cutters 16 and 22 on the bottom and upper cutter-bars serve to cut the crust on the bottom and top of the cheese, respectively. The bar 9 may be raised or lowered according to the height of the cheese, and this adjustment of the bar 9 requires the wire 23 to be drawn in or paid out in order to vary the operative length of the cutter-wire.

Changes within the scope of the appended claims may be made in the form and proportion of some of the parts while their essential features are retained and the spirit of the invention is embodied. Hence I do not desire to be limited to the precise form of all the parts as shown, reserving the right to vary therefrom.

I claim—

1. A cheese-cutter comprising a base, an upper supporting-bar, a vertical guide between the base and said supporting-bar, a traveler confined in said vertical guide and having a knife arranged to cut a cheese at the rind thereof, a cutter-wire, and means for moving the cutter-wire in a path at right angles to the operation of the traveler and the knife, as set forth.

2. A cheese-cutter comprising a base, a supporting-bar, upper and lower cutter-bars, a cutter-wire stretched between the cutter-bars, and cutting-knives carried by said cutter-bars, substantially as described.

3. A cheese-cutter comprising a base, a cutter-bar slidably fitted to the base and provided with an offstanding arm, another cutter-bar connected adjustably to the arm of the first-mentioned bar, a cutter-wire attached to and stretched between the cutter-bars, and a rind-cutter guided to travel in a path at right angles to the cutter-wire, substantially as described.

4. A cheese-cutter comprising a base, an adjustable supporting-bar, a cutter-wire having an offstanding arm, another cutter-bar slidably fitted to said arm and operatively connected thereby to the first-named cutter-bar and adapted to travel therewith, a cutter-wire attached between the cutter-bars and connected to one of them, and means mounted on the other cutter-bar and having the cutter-wire connected thereto for varying the operative length of the same.

5. A cheese-cutter comprising a base, the posts, one of which is provided with a slot, a traveler fitted in said slotted post and provided with a crust-cutting knife, a cutter-wire, and means for moving the cutter-wire in a radial path on the base, substantially as described.

In witness whereof I have hereunto set my hand in the presence of two witnesses.

ANDERSON McINTOSH.

Witnesses:
 IRA WAUGH,
 R. B. CANFIELD.